(12) United States Patent
Bohn et al.

(10) Patent No.: US 6,292,311 B1
(45) Date of Patent: Sep. 18, 2001

(54) METHOD AND APPARATUS FOR CENTERING A LENS WITHIN AN OPTICAL BORE SLEEVE

(75) Inventors: David D Bohn, Ft Collins; Eugene A Miksch, Loveland, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/418,213

(22) Filed: Oct. 13, 1999

(51) Int. Cl.$^7$ ....................................... G02B 7/02
(52) U.S. Cl. ..................... 359/819; 359/811; 359/813; 359/820
(58) Field of Search ................... 359/813, 811, 359/819, 820, 822, 826

(56) References Cited

U.S. PATENT DOCUMENTS

| | | | |
|---|---|---|---|
| 4,778,252 | * | 10/1988 | Filho ..................................... 359/819 |
| 4,812,015 | * | 3/1989 | Iizuka et al. ......................... 359/819 |
| 4,854,671 | * | 8/1989 | Hanke et al. ........................ 359/820 |
| 5,249,082 | * | 9/1993 | Newman ............................... 359/813 |
| 5,608,579 | * | 3/1997 | Nomura ................................ 359/820 |
| 6,088,160 | * | 7/2000 | Nomura et al. ...................... 359/819 |
| 6,122,115 | * | 9/2000 | Plummer et al. .................... 358/822 |

OTHER PUBLICATIONS

Modern Optical Engineering, author Warren J. Smith, published by McGraw Hill Inc., (1990), pp. 490–492.

* cited by examiner

*Primary Examiner*—Loha Ben
(74) *Attorney, Agent, or Firm*—Jack A. Lenell

(57) ABSTRACT

A method and apparatus for centering an optical component, such as a lens element, within an optical bore sleeve. The optical component has an outer perimeter, and the optical bore sleeve has an inner perimeter for receiving the outer perimeter of the optical component. A plurality of deformable ridges are interposed between the outer perimeter of the optical component and the inner perimeter of the sleeve for aligning the optical component and the sleeve along a common optical axis as the ridges are deformed upon insertion of the optical component into the sleeve.

15 Claims, 9 Drawing Sheets

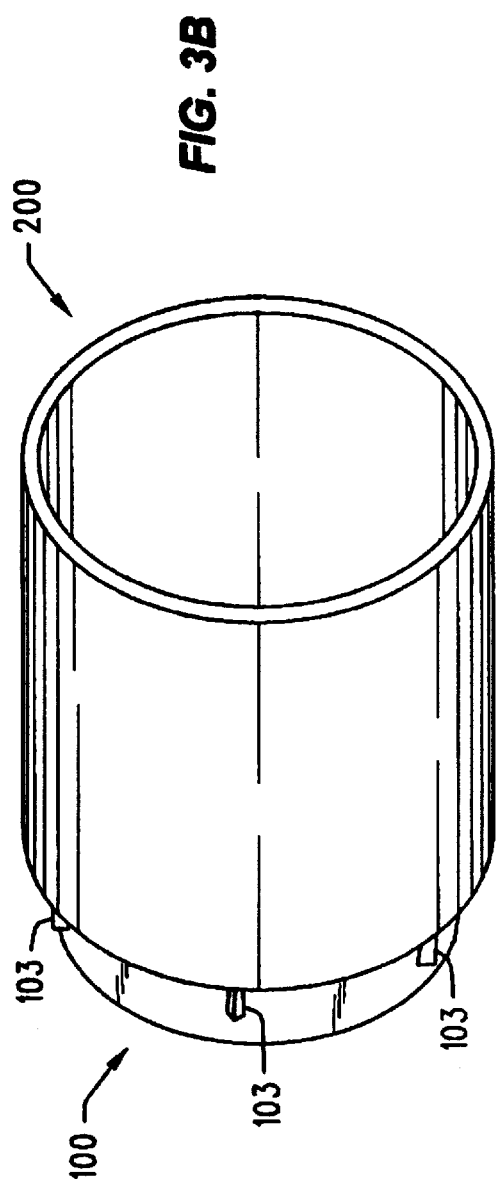
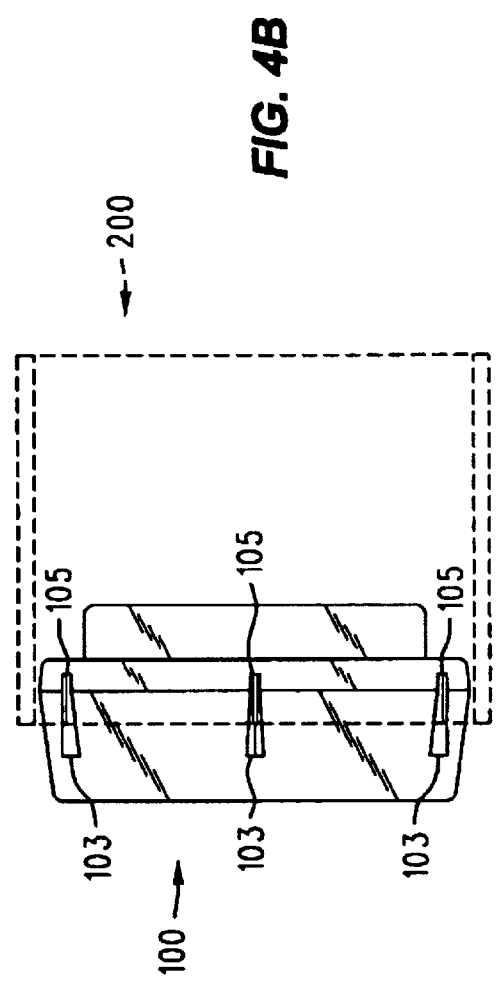

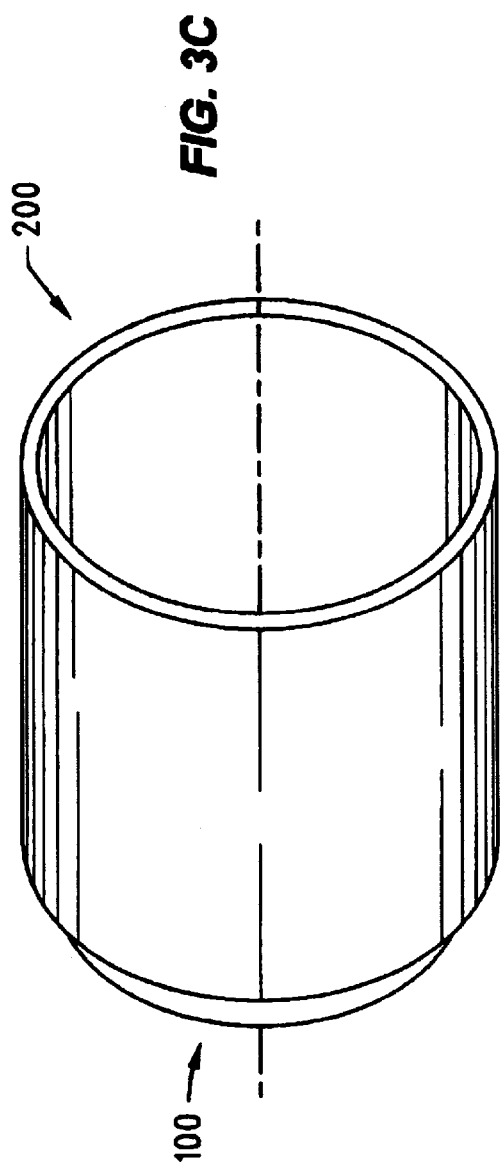
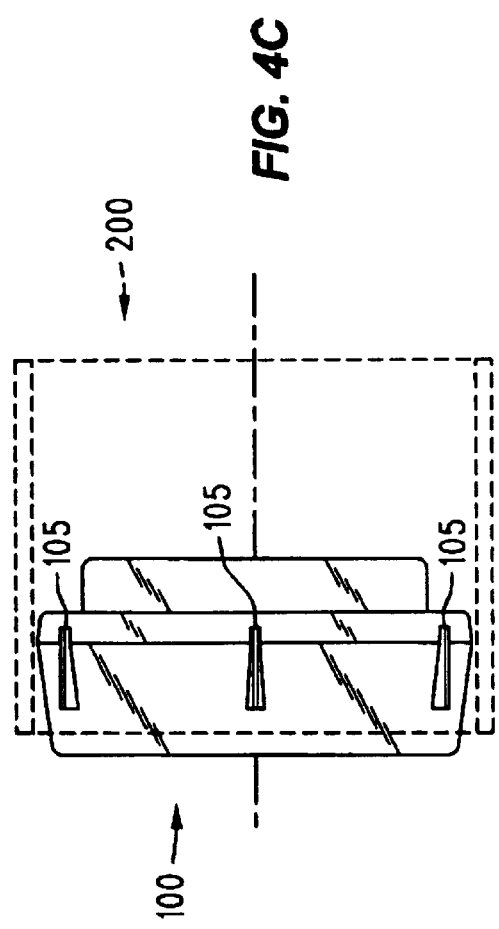

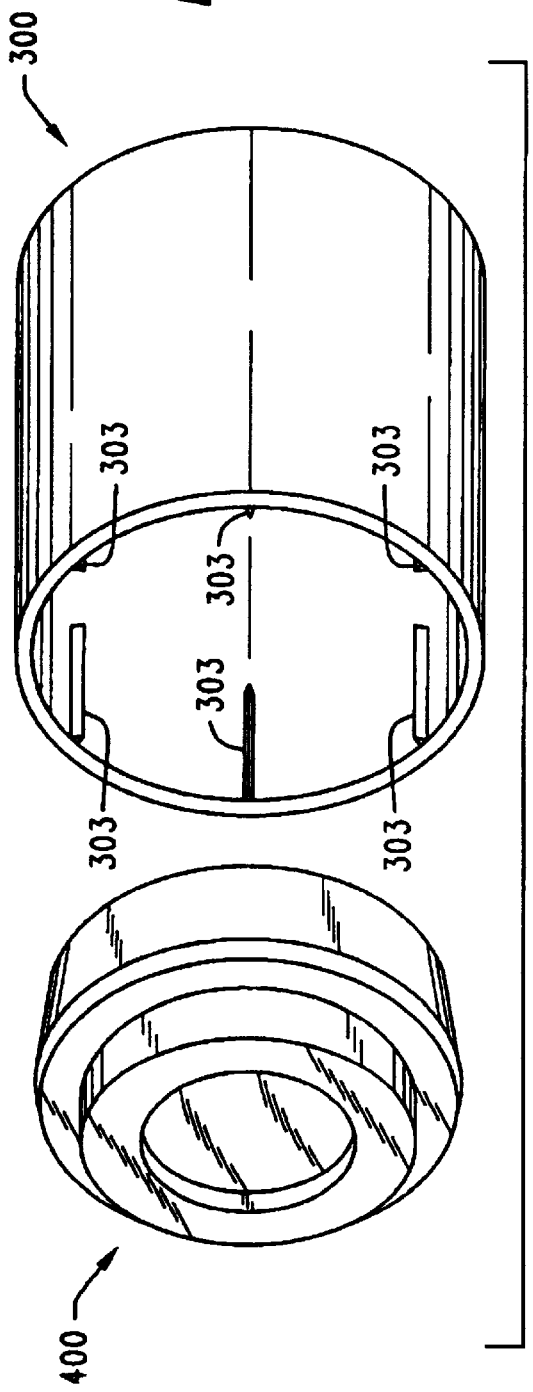
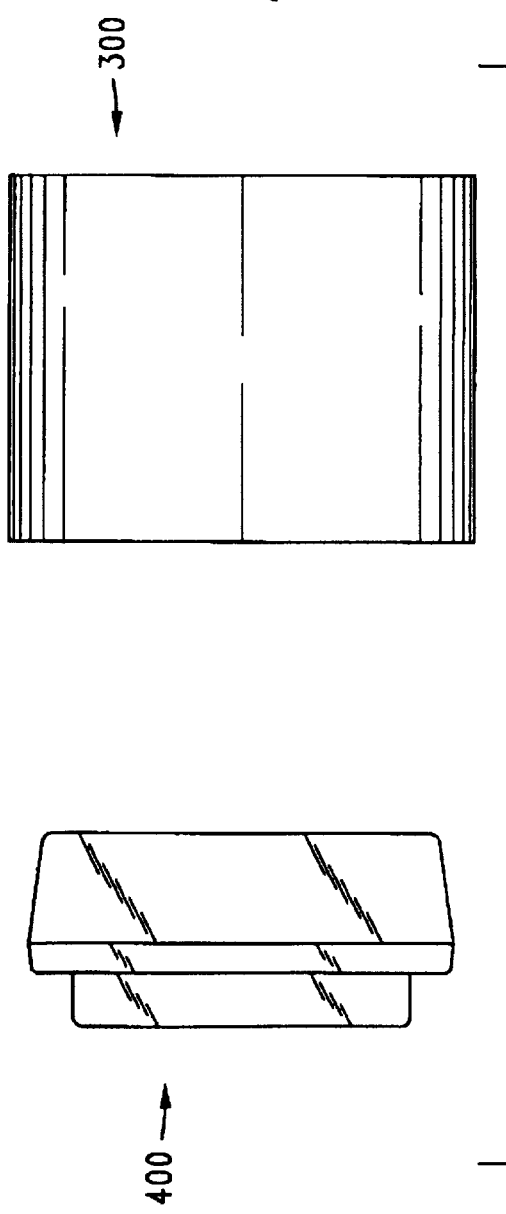

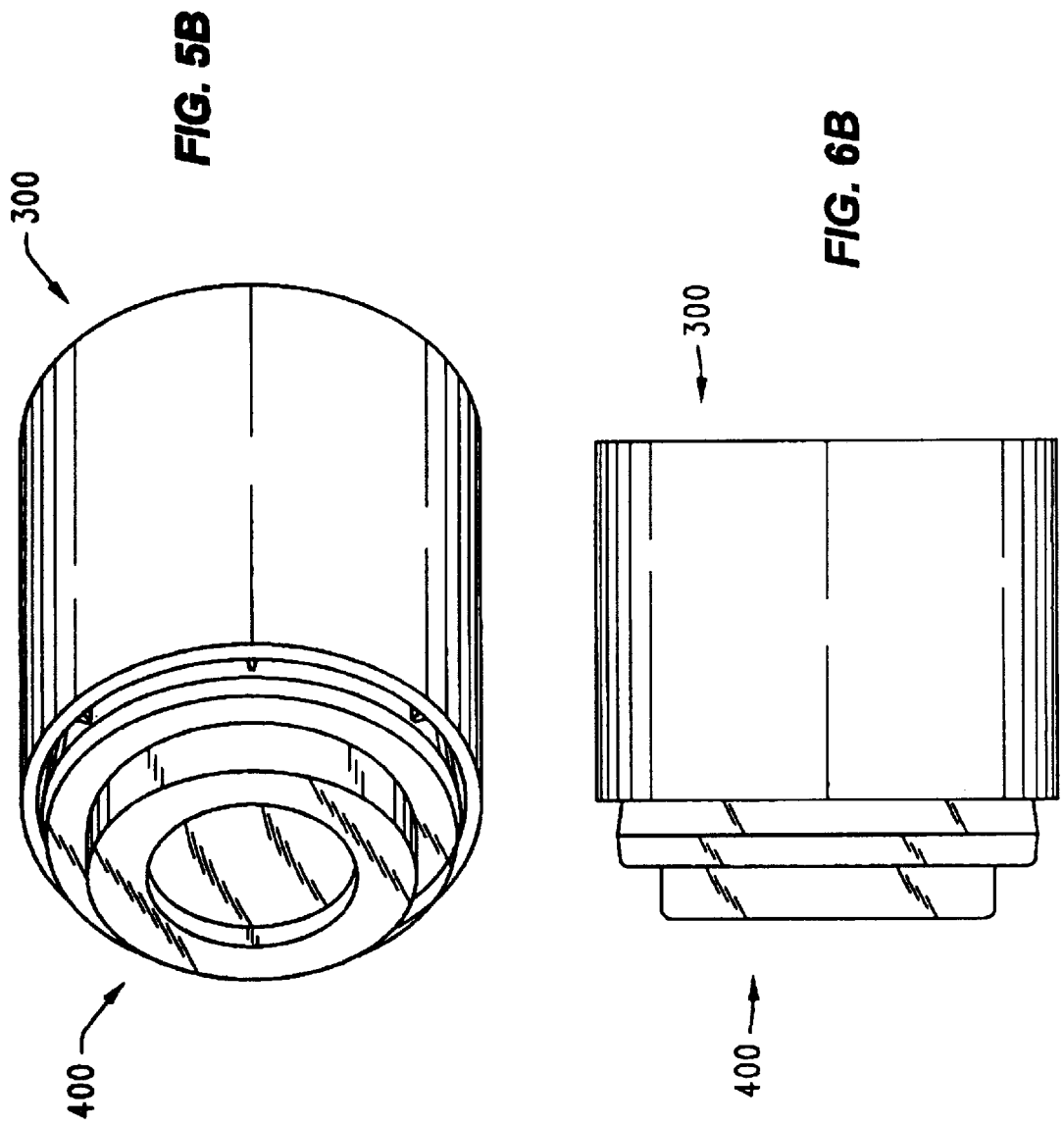

METHOD AND APPARATUS FOR CENTERING A LENS WITHIN AN OPTICAL BORE SLEEVE

FIELD OF THE INVENTION

The invention generally relates to optics, and more specifically relates to centering a lens within an optical bore sleeve.

BACKGROUND OF THE INVENTION

It is well known that optical arrangements typically require alignment along a common centerline (or optical axis) in order to function properly. For example, in order for a lens to function properly in conjunction with an image detector, typically an optical bore sleeve is used to hold the lens in alignment with the common centerline (or optical axis) of the bore sleeve and the image detector. Of course, the lens must be appropriately centered within bore sleeve, so that the lens, the bore sleeve and the image detector are all in alignment with the common centerline (or optical axis.)

In a discussion of lens mounts at pages 490–492 of Modern Optical Engineering published by McGraw Hill Inc., (1990), which are hereby incorporated by reference, author Warren J. Smith points out that optical lens elements are almost always mounted in a close-fitting sleeve. Various ways of centering the lens within the bore sleeve that are known in the prior art are discussed by Smith, including: retaining the lens by a wire spring ring in a V-grove extending into the inner bore of the sleeve as shown in FIG. 1A; retaining the lens by a flat spring ring as shown in FIG. 1B; retaining the lens by three grooved rods arrange with respect to each other at one hundred and twenty degree angles as shown in FIG. 1C; retaining the lens by threaded lock rings as shown in FIGS. 1D and 1E; retaining the lens by a thin, so called "spinning" shoulder of the sleeve, which is folded over in a burnishing step as shown in FIG. 1F; and retaining the lens by cementing it in place, with a trough for cement overflow, as shown in FIG. 1G.

While such examples of the prior art each provide some advantages, other challenges still remain. For example, if the lens and bore sleeve are made to loose tolerances to provide for ease of manufacturing and low cost, then typically the bore sleeve is made oversized to allow for variations in the lens and variations in the bore sleeve. Accordingly, the lens fits loosely in the oversized bore, resulting in poor optical alignment and performance.

Alternatively, if the lens and bore sleeve are made to tight tolerances then the lens fits closely in the bore, providing good optical alignment and performance. However, manufacturing the lens and bore sleeve to such tight tolerances is much more difficult and expensive than manufacturing to loose tolerances.

As another alternative, ease and low cost are achieved by manufacturing the lens and bore sleeve to loose tolerances, while good optical alignment and performance are achieved by subsequent careful and complex realignment procedures that center the lens within the bore sleeve. However, such careful and complex realignment procedures are made much more difficult and expensive to perform, in light of the loose tolerances of the lens and bore sleeve.

What is needed is a simple, easy and convenient method and apparatus for centering the lens within the optical bore sleeve, while maintaining good optical alignment and performance, even when the lens and bore sleeves are made to loose tolerances for ease of manufacturing and low cost.

SUMMARY OF THE INVENTION

The invention provides a simple, easy and convenient method and apparatus for centering an optical component (such as a lens element) within an optical bore sleeve, while maintaining good optical alignment and performance, even when the optical component and bore sleeve are made to loose tolerances for ease of manufacturing and low cost.

Briefly and in general terms the invention includes a optical component having an outer perimeter and an optical bore sleeve having an inner perimeter for receiving the outer perimeter of the optical component. In accordance the principles of the invention, a plurality of deformable ridges are interposed between the outer perimeter of the optical component and the inner perimeter of the sleeve for aligning the and optical component and the sleeve along a common optical axis as the ridges are deformed upon insertion of the optical component into the sleeve.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 3A through 3C are isometric views illustrating operation of the preferred embodiment of the invention.

FIGS. 4A through 4C are simplified side views corresponding to FIGS. 3A through 3C.

FIGS. 5A through 5C are isometric views illustrating operation of an alternative embodiment of the invention.

FIGS. 6A through 6C are simplified side views corresponding to FIGS. 5A through 5C.

DETAILED DESCRIPTION OF PREFERRED EMBODIMENT

FIGS. 2A through 2D show various views of a preferred embodiment of the invention. The invention includes a optical component 100, such as a lens element, as shown in the figures having an outer perimeter. In accordance the principles of the invention, upon insertion of the optical component into an optical bore sleeve (not shown in FIGS. 2A–2D) a plurality of deformable ridges 103 are interposed between the outer perimeter of the optical component and an inner perimeter of the sleeve for aligning the optical component and the sleeve along a common optical axis as the ridges are deformed. In the preferred embodiment, the deformable ridges 103 extend outwardly from the outer perimeter of the optical component, as shown in the FIGS. 2A–2D. In the preferred embodiment, the deformable ridges are made integral with the optical component, which is formed of one or more suitable plastics in one or more injection molding processes. For manufacturing ease, just one suitable plastic is used in just one injection molding process.

In the preferred embodiment shown in FIGS. 2A–2D, the optical component has a substantially circular cross section, and the deformable ridges are substantially uniformly shaped, are substantially uniformly arranged about the perimeter of the optical component, and are of a substantially uniform ductility, each so as to contribute to aligning the optical component and the sleeve along the common optical axis as the ridges are deformed upon the insertion of the optical component into the sleeve. For example, as particularly shown in FIG. 2B, in the preferred embodiment, a total of six deformable ridges each have a respective substantially triangular cross section and a substantially uniform height dimension, h, substantially within a range from approximately one tenth of a millimeter to approximately a half of a millimeter (prior to any deformation), wherein the ridges 103 are uniformly arranged about the perimeter of the optical component approximately every sixty degrees.

To facilitate the deformation process, the ridges are made from a material having a limited hardness. For example, to provide for the manufacturing ease, in the preferred embodiment the entire optical component, including the ridges, is made from one suitable transparent plastic, such as: Polycarbonate, having a Rockwell hardness (scale M) of 70; Methyl Methacrylate Styrene Copolymer having a Rockwell hardness (scale M) of 75; Polystyrene (Styrene) having a Rockwell hardness (scale M) of 90; or Methyl Methacrylate (Acrylic) having a Rockwell hardness (scale M) of 97.

Figure 1A:
FIGS. 1A through 1G show cross sectional views of the prior art.
Figure 1B:
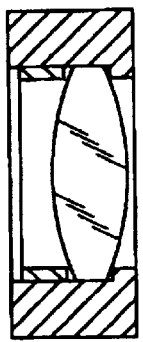
Figure 1C:
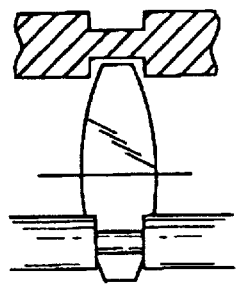
Figure 1D:
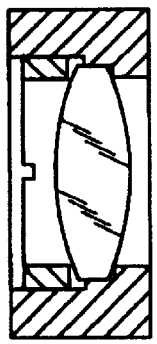
Figure 1E:
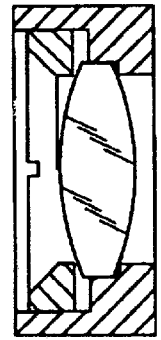
Figure 1F:
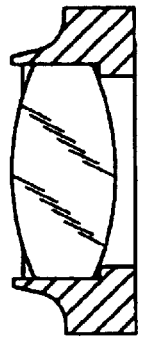
Figure 1G:
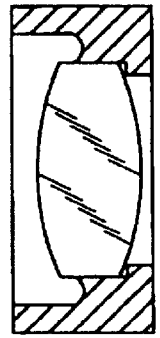
Figure 2A:
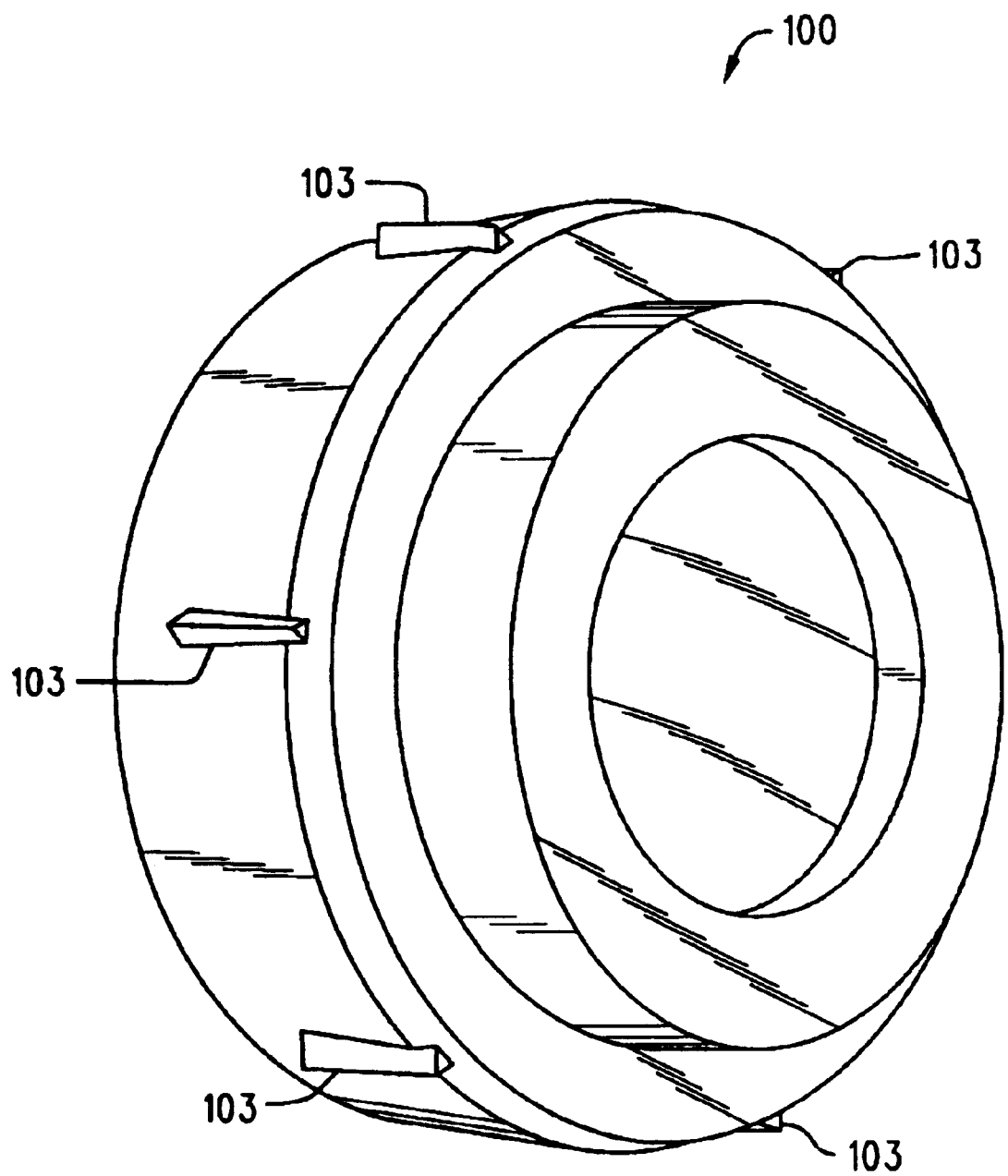
FIGS. 2A through 2D show various views of a preferred embodiment of the invention.
Figure 2C:
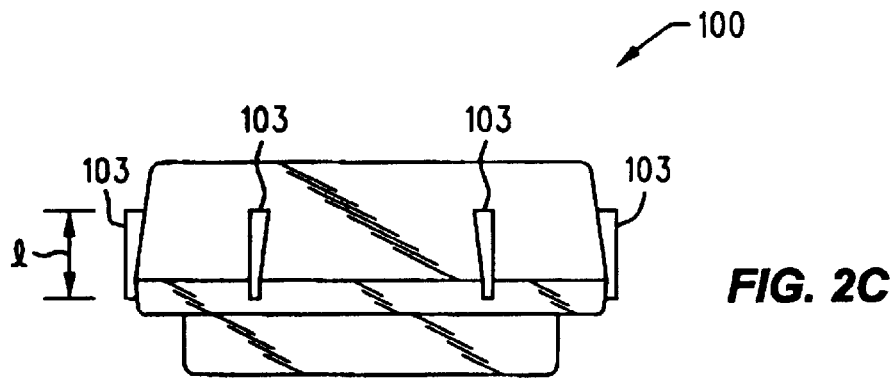
Figure 2B:
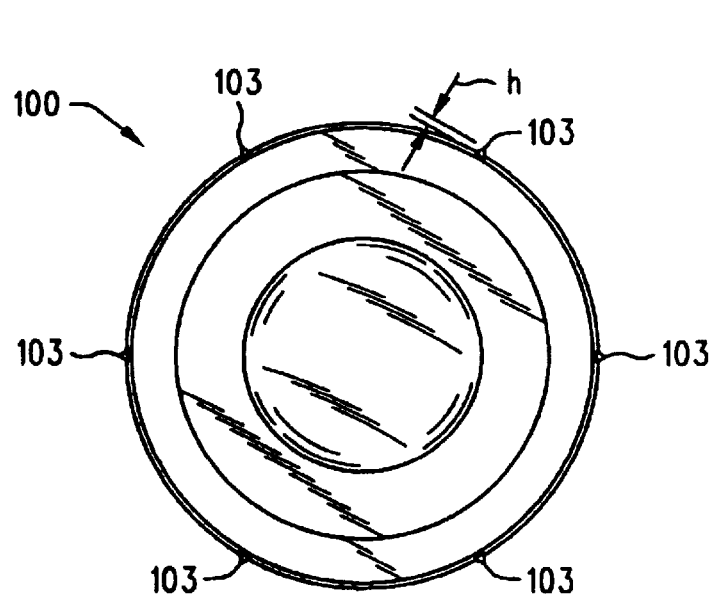
Figure 2D:
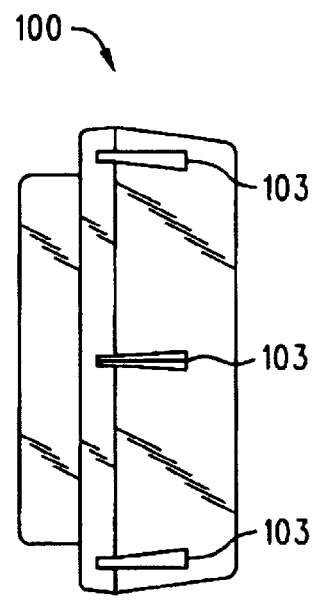

As particularly shown in side view in FIG. 2C, in the preferred embodiment the deformable ridges each have a respective longitudinal dimension, l, that substantially within a range from approximately one millimeter to approximately three millimeters, and that is substantially uniform among the deformable ridges 103, so as to align the optical component and the sleeve along the common optical axis as the ridges are deformed upon the insertion of the optical component into the sleeve.

In view of the preceding discussion of the substantially triangular cross section, it should be understood that each of the ridges (prior to the deformation) has a respective pointed, elongated apex, which extends outwardly from the perimeter of the optical component, which extends laterally along the longitudinal dimension of each ridge, and which corresponds to such substantially triangular cross section. As will be discussed in further detail subsequently herein, the ridges are deformed upon the insertion of the optical component into the sleeve, so that the apex of each ridge is flattened along its longitudinal dimension.

Figure 3A:
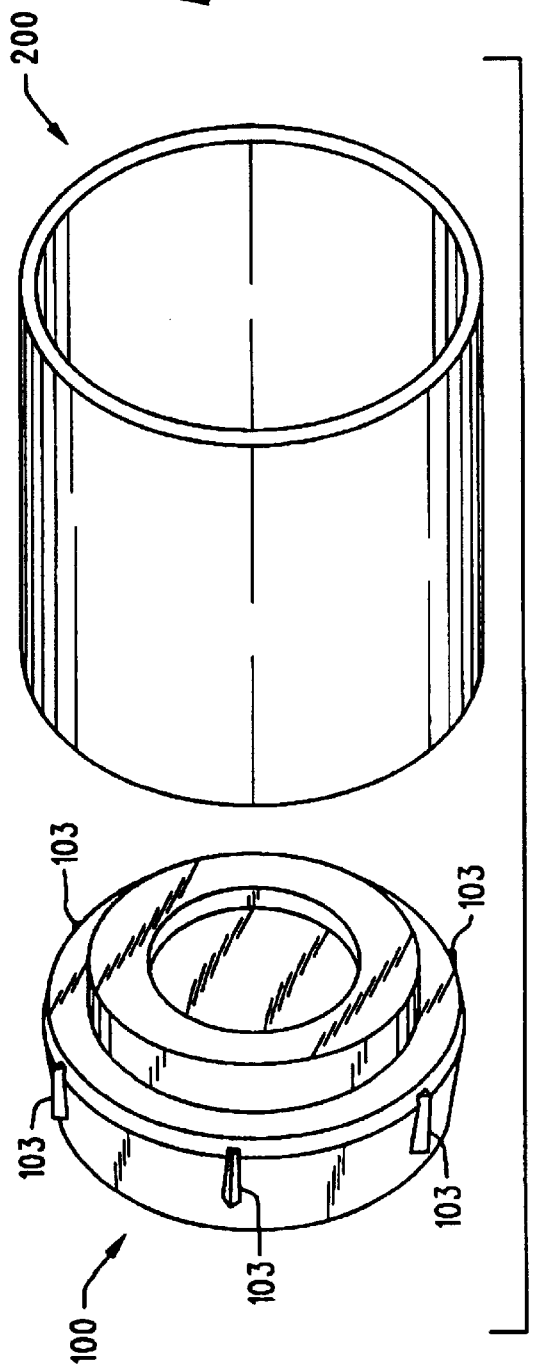
Figure 4A:
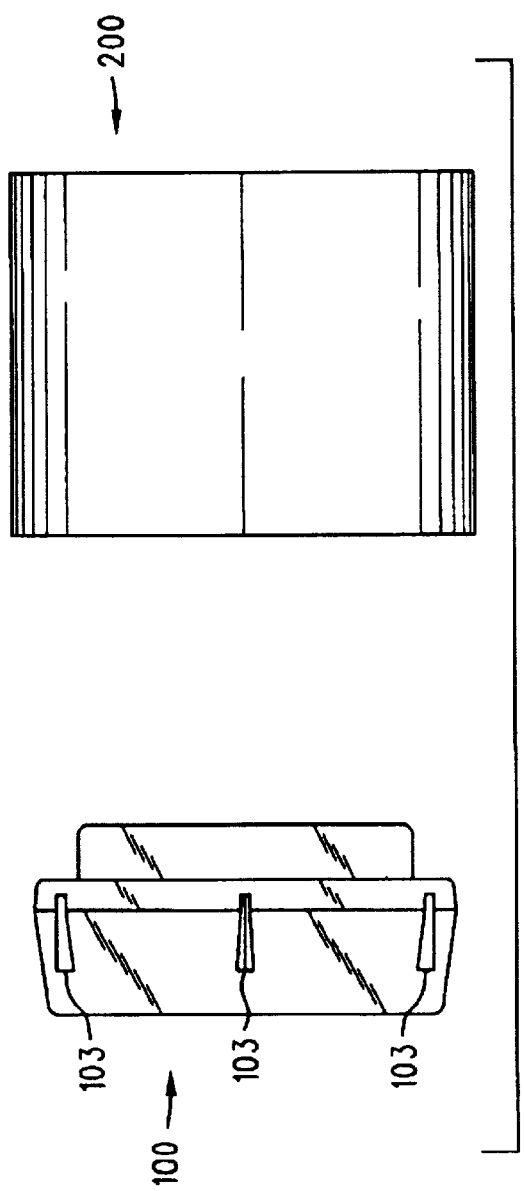

FIGS. 3A through 3C are a series of three isometric views illustrating operation of the preferred embodiment of the invention. FIGS. 4A through 4C are simplified side views corresponding to FIGS. 3A through 3C. In addition to the optical component 100 having the deformable ridges 103, the invention further includes the optical bore sleeve 200, which has the inner perimeter for receiving the outer perimeter of the optical component, wherein the inner perimeter of the optical bore sleeve has a substantially circular cross section as shown in the figures.

Although, for the sake of simplicity, in the figures an outer perimeter of the optical bore sleeve is also shown as substantially circular, it should be understood that the invention is not limited to such forms of the outer perimeter of the optical bore sleeve. Indeed, in consumer products applications such as optical mouse (computer pointing device) applications and optical page scanner applications, efficiency and economy of manufacturing dictate that the form of the outer perimeter of the optical bore sleeve serve as a much larger, multipurpose assembly for accommodating other components, in addition to the optical component.

FIGS. 3A and 4A show the optical component 100 positioned near the optical bore sleeve 200. FIGS. 3B and 4B show the optical component inserted approximately half way into the optical bore sleeve. In FIG. 4B, the optical bore sleeve is drawn as if it were transparent (as suggested by dashed lines) so as to reveal flattened portions 105 of the respective apex of each of the ridges 103. Accordingly, it should be understood that the inner perimeter of the bore sleeve 200 engages and flattens the apex of each of the ridges for approximately halfway along the longitudinal dimension of each ridge, when the optical component is inserted approximately half way into the optical bore sleeve.

FIGS. 3C and 4C show the optical component fully inserted into the optical bore sleeve. In FIG. 4C, the optical bore sleeve is drawn (once again) as if it were transparent (as suggested by dashed lines), so as to reveal the respective flattened apex 105 of each of the ridges. Accordingly, it should be understood that the inner perimeter of the bore sleeve 200 engages and flattens the apex of each of the ridges along the entire longitudinal dimension of each ridge, when the optical component is fully inserted into the optical bore sleeve. In response to such apex flattening, the deformable ridges each have a respective height dimension that is substantially within a range from approximately five one hundredths of a millimeter to approximately four tenths of a millimeter upon deformation of the ridges, as the optical component is inserted into the sleeve.

Preferably, the optical component and bore sleeve are made to loose tolerances for ease of manufacturing and low cost. For example in the preferred embodiment the outer perimeter of the optical component, plus the ridges, is made to have a diameter of approximately six millimeters with a tolerance of approximately two hundredths of a millimeter, and the inner perimeter of the bore sleeve is made to have a diameter of approximately five and nine tenths of a millimeter with a tolerance of approximately two hundredths of a millimeter.

To provide for uniform deformation, in the preferred embodiment th bore sleeve is made from a material, such as a suitable plastic, that is substantially harder than the material of the ridges. For example, in the preferred embodiment, the bore sleeve is made from high modulus Polycarbonate strengthened with approximately thirty percent glass fibers.

In accordance with the various uniformity teachings herein, respective apexes of each ridge tend to deform by flattening equally, so as to balance forces exerted on the apexes by the sleeve, and so as to provide an advantageous centering action. This aligns the optical component and the sleeve along the common optical axis as the ridges are deformed upon the insertion of the optical component into the sleeve.

Figure 5C:
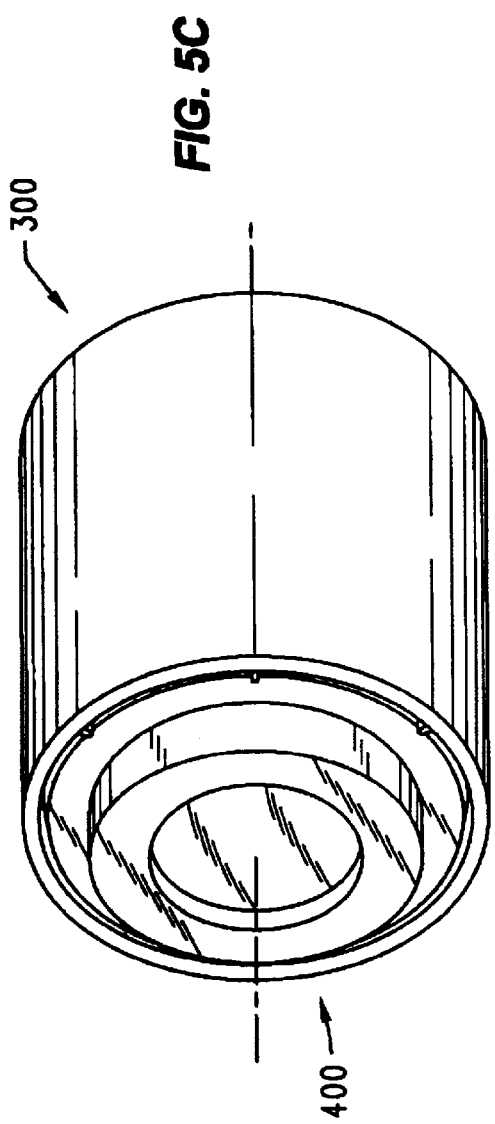
Figure 6C:
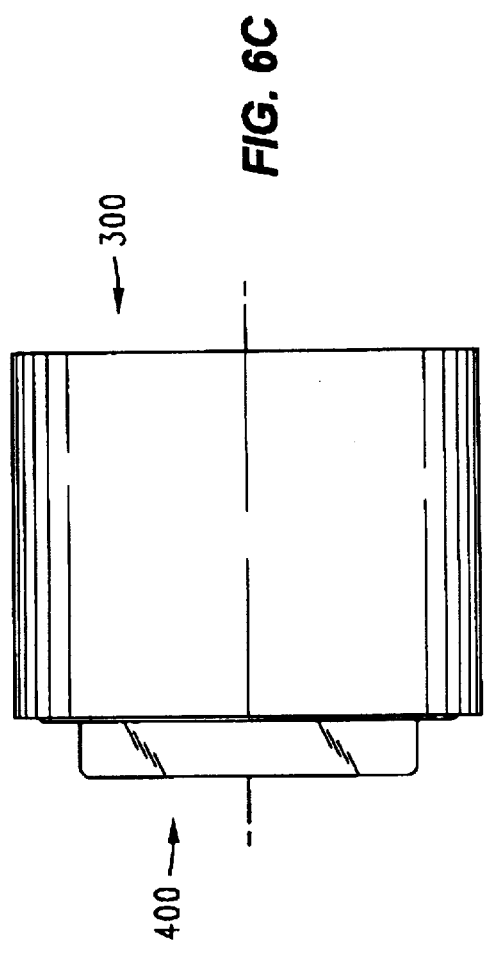

FIGS. 5A through 5C are a series of three isometric views illustrating operation of an alternative embodiment of the invention. FIGS. 6A through 6C are simplified side views corresponding to FIGS. 6A through 6C. As particularly shown in FIG. 5A, in the alternative embodiment, deformable ridges 303 are made integral with an inner perimeter of an alternative optical bore sleeve bore 300, which is formed of one or more suitable plastics in one or more injection molding processes.

FIGS. 5A and 6A of the alternative embodiment show the alternative optical component 400 having a substantially smooth outer perimeter positioned near the alternative optical bore sleeve 200. To provide for uniform deformation, in the alternative embodiment, the smooth outer perimeter of the alternative optical component is made from a material, such as a suitable plastic, that is substantially harder than the material of the deformable ridges.

FIGS. 5B and 6B show the alternative optical component inserted approximately half way into the alternative optical bore sleeve. Accordingly, it should be understood that the outer perimeter of the alternative optical component 400 engages and flattens the apex of each of the ridges for approximately halfway along the longitudinal dimension of each ridge, when the alternative optical component is inserted approximately half way into the alternative optical bore sleeve.

FIGS. 5C and 6C show the alternative optical component fully inserted into the alternative optical bore sleeve. Accordingly, it should be understood that the outer perimeter of the alternative optical component 400 engages and entirely flattens the apex of each of the ridges along the longitudinal dimension of each ridge, when the alternative optical component is fully inserted into the alternative optical bore sleeve.

As discussed, the invention provides a simple, easy and convenient method and apparatus for centering an optical component, such as a lens element, within an optical bore sleeve, while maintaining good optical alignment and performance, even when the optical component and bore sleeve are made to loose tolerances for ease of manufacturing and low cost. Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

What is claimed is:

1. An apparatus comprising:
    a optical component having an outer perimeter; and
    an optical bore sleeve having an inner perimeter for receiving the outer perimeter of the optical component;
    a plurality of deformable ridges interposed between the outer perimeter of the optical component and the inner perimeter of the sleeve for aligning the optical component and the sleeve along a common optical axis as the ridges are deformed upon insertion of the optical component into the sleeve, wherein the deformable ridges each have a respective longitudinal dimension that is substantially within a range from approximately one millimeter to approximately three millimeters.

2. An apparatus as in claim 1 wherein the deformable ridges extend outwardly from the outer perimeter of the optical component.

3. An apparatus as in claim 1 wherein the deformable ridges extend from the inner perimeter of the sleeve, so as to engage the outer perimeter of the optical component.

4. An apparatus as in claim 1 wherein:
    the optical component having the outer perimeter is a lens having an outer perimeter; and
    the deformable ridges extend outwardly from the outer perimeter of the lens.

5. An apparatus as in claim 1 wherein:
    the optical component having the outer perimeter is a lens having an outer perimeter; and
    the deformable ridges extend from the inner perimeter of the sleeve, so as to engage the outer perimeter of the lens.

6. An apparatus as in claim 1 wherein the deformable ridges are substantially uniformly shaped, so as to align the optical component and the sleeve along the common optical axis as the ridges are deformed upon the insertion of the optical component into the sleeve.

7. An apparatus as in claim 1 wherein the deformable ridges are substantially uniformly arranged, so as to align the optical component and the sleeve along the common optical axis as the ridges are deformed upon the insertion of the optical component into the sleeve.

8. An apparatus as in claim 1 wherein the deformable ridges are of a substantially uniform ductility, so as to align the optical component and the sleeve along the common optical axis as the ridges are deformed upon the insertion of the optical component into the sleeve.

9. An apparatus as in claim 1 wherein the deformable ridges each have a respective height dimension that is substantially uniform among the deformable ridges, so as to align the optical component and the sleeve along the common optical axis as the ridges are deformed upon the insertion of the optical component into the sleeve.

10. An apparatus as in claim 1 wherein the deformable ridges each have a respective height dimension that is substantially within a range from approximately one tenth of a millimeter to approximately a half of a millimeter prior to any deformation of the ridges.

11. An apparatus as in claim 1 wherein the deformable ridges each have a respective height dimension that is substantially within a range from approximately five one hundredths of a millimeter to approximately four tenths of a millimeter upon deformation of the ridges as the optical component is inserted into the sleeve.

12. An apparatus as in claim 1 wherein the deformable ridges each have a respective longitudinal dimension that is substantially uniform among the deformable ridges, so as to align the optical component and the sleeve along the common optical axis as the ridges are deformed upon the insertion of the optical component into the sleeve.

13. An apparatus as in claim 1 wherein the optical component has a substantially circular cross section.

14. An apparatus as in claim 1 wherein the sleeve has a substantially circular cross section.

15. A method comprising the steps of:
    providing a optical component having an outer perimeter; and further providing an optical bore sleeve having an inner perimeter for receiving the outer perimeter of the optical component;
    interposing a plurality of deformable ridges between the outer perimeter of the optical component and the inner perimeter of the sleeve, wherein the deformable ridges each have a respective longitudinal dimension that is substantially within a range from approximately one millimeter to approximately three millimeters;
    inserting the optical component into the sleeve;
    deforming the ridges; and
    aligning the optical component and the sleeve along a common optical axis.

* * * * *